US007934107B2

(12) United States Patent  (10) Patent No.: US 7,934,107 B2
Walrath  (45) Date of Patent: Apr. 26, 2011

(54) POWER MANAGEMENT SYSTEM AND METHOD

(75) Inventor: Craig A. Walrath, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 654 days.

(21) Appl. No.: 11/657,259

(22) Filed: Jan. 24, 2007

(65) Prior Publication Data
US 2008/0178032 A1  Jul. 24, 2008

(51) Int. Cl.
G06F 1/32 (2006.01)
(52) U.S. Cl. ........ 713/300; 713/310; 713/320; 713/321; 713/322; 713/323; 713/324; 713/330; 713/340
(58) Field of Classification Search .................. 713/300, 713/310, 320–324, 330, 340
See application file for complete search history.

(56) References Cited

U.S. PATENT DOCUMENTS

| 4,935,642 | A | * | 6/1990 | Obelode et al. | 307/32 |
|---|---|---|---|---|---|
| 5,565,759 | A | | 10/1996 | Dunstan | |
| 5,600,230 | A | | 2/1997 | Dunstan | |
| 5,915,120 | A | | 6/1999 | Wada et al. | |
| 6,975,947 | B2 | | 12/2005 | Oh | |
| 7,062,250 | B1 | * | 6/2006 | Kosaka | 455/343.5 |
| 7,203,849 | B2 | * | 4/2007 | Dove | 713/300 |
| 7,552,349 | B2 | * | 6/2009 | Hassan et al. | 713/320 |
| 2001/0001532 | A1 | | 5/2001 | Galbraith et al. | |
| 2001/0020940 | A1 | | 9/2001 | Nakazato et al. | |
| 2003/0149904 | A1 | | 8/2003 | Kim | |
| 2003/0158609 | A1 | | 8/2003 | Chiu | |
| 2005/0001627 | A1 | | 1/2005 | Anbuky et al. | |
| 2005/0022043 | A1 | * | 1/2005 | Yamaji et al. | 713/340 |
| 2005/0206345 | A1 | | 9/2005 | Maskatia et al. | |
| 2006/0074405 | A1 | * | 4/2006 | Malackowski et al. | 606/1 |
| 2008/0077811 | A1 | * | 3/2008 | Dove | 713/300 |

FOREIGN PATENT DOCUMENTS

EP  1 617 316 A2  1/2006

OTHER PUBLICATIONS

PCT international Search Report and Written Opinion of the International Searching Authority, having a date of mailing of Jun. 24, 2008 in co-pending PCT International Patent Application No. PCT/US2008/000722, having an International Filing Date of Jan. 17, 2008 with the applicant being Hewlett-Packard Development Company, L.P. et al., and entitled: Power Management System and Method.

* cited by examiner

Primary Examiner — Abdelmoniem Elamin

(57) ABSTRACT

A power management system comprises a power management module configured to determine a power draw limit for operating an electronic device by a power source, the power management module configured to control use of power-consuming elements of the electronic device based on a prioritization of the power-consuming elements to limit a power draw by the electronic device from the power source to the power draw limit.

34 Claims, 3 Drawing Sheets

POWER MANAGEMENT SYSTEM AND METHOD

BACKGROUND

Electronic devices are often configured to be powered by a battery or other type of depletable power source (e.g., rechargeable and non-rechargeable batteries, fuel cells, solar-based cells or batteries, etc.). However, these types of power sources can provide power for limited time before needing recharging (if possible) or replacement. Further, cooling systems, processors, display devices and other elements of an electronic device can draw significant levels of power from the power source, thereby shortening the useful life of the power source. Additionally, even if the electronic device is being powered by a generally non-depletable power source (e.g., an alternating current (AC) power source), significant power draws can cause high thermal profiles, thereby presenting a safety issue as well as requiring larger and more expensive cooling systems for the electronic device.

BRIEF DESCRIPTION OF THE DRAWINGS

For a more complete understanding of various embodiments and the advantages thereof, reference is now made to the following descriptions taken in connection with the accompanying drawings in which.

DETAILED DESCRIPTION OF THE DRAWINGS

Figure 1:
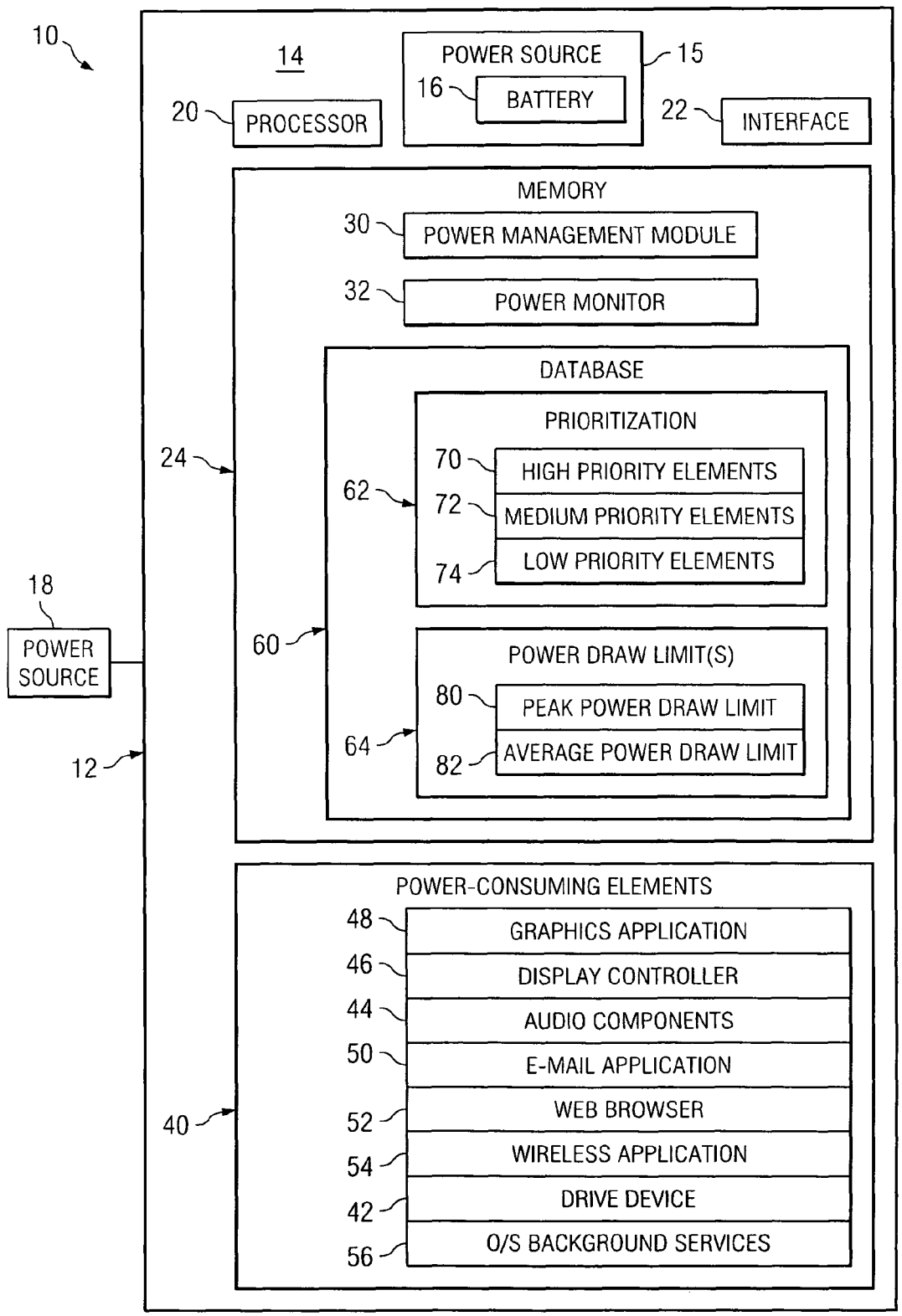
FIG. 1 is a block diagram illustrating an embodiment of a power management system.

FIG. 1 is a block diagram illustrating an embodiment of a power management system 10. In the embodiment illustrated in FIG. 1, system 10 is implemented in an electronic device 12. For ease of illustration and description of an exemplary embodiment, system 10 will be described as being embodied in a laptop or a notebook computer 14. However, it should be understood that system 10 may be implemented in other types of electronic devices such as, but not limited to, a personal digital assistant, tablet computer, cellular telephone, electric vehicle, desktop computer, or handheld game or entertainment device. In the embodiment illustrated in FIG. 1, electronic device 12 is configured to be powered by an internal power source 15, such as a battery 16, and/or by an external power source 18, such as an external battery or alternating current (AC) power supply. The term "battery" as used herein shall mean any type of depletable power source that is generally capable of providing power for a limited amount of time before the power source needs to be recharged, refueled and/or replaced such as, but not limited to, a rechargeable or non-rechargeable battery, fuel cell, solar cell or battery, etc. It should be understood that electronic device 12 may be configured to be solely powered by battery 16 or convertible such that electronic device may be powered by battery 16 or external power source 18.

In the embodiment illustrated in FIG. 1, electronic device 12 comprises a processor 20, an interface 22 and a memory 24. Interface 22 comprises any type of device for outputting information from electronic device 12 and/or receiving information as input to electronic device 12. For example, interface 22 may comprise a keyboard, mouse, display, touch screen, microphone, speaker, buttons, wireless or wired controls, levers, sliders or any other type of input/output device(s). Memory 24 may comprise any type of memory element such as, but not limited to, dynamic random access memory (DRAM), solid state memory, a hard disk drive, etc. In the embodiment illustrated in FIG. 1, memory 24 comprises a power management module 30 and a power monitor 32. Power management module 30 and power monitor 32 may comprise hardware, software, firmware or a combination thereof. In FIG. 1, power management module 30 and power monitor 32 are illustrated as being stored in memory 24 so as to be accessible and/or executable by processor 20; however, it should be understood that power management module 30 and/or power monitor 32 may otherwise located, even remotely (e.g., remote from memory 24 and/or remote from electronic device 12). In FIG. 1, power management module 30 and power monitor 32 are illustrated as separate components. However, it should be understood that the operational and/or functional characteristics of power management module 30 and/or power monitor 32 may be configured to be performed by a single element or multiple elements.

Power management module 30 is configured to dynamically control use of power-consuming elements associated with electronic device 12 based on a predetermined and/or dynamic prioritization of power-consuming elements of electronic device 12 to limit the power draw of electronic device 12 from power sources 15 and/or 18. For example, in some embodiments, power management module 30 dynamically controls use of one or more power-consuming elements of electronic device to limit and/or otherwise control a peak power and/or the average power draw from a power source. Thus, for example, for electronic device 12 having multiple functions and/or capabilities, embodiments of system 10 turn off/on and/or otherwise adjust the level of use of one or more of the functions/capabilities of device 12 (e.g., based on the prioritization) while enabling use of other and/or as many functions/capabilities of device 12 as possible (e.g., high priority functions) while limiting the peak power and/or average power draw by electronic device 12.

Power monitor 32 is used to analyze and/or otherwise determine and monitor the power being drawn by electronic device 12 from a particular power source. Power management module 30 cooperates and/or otherwise interfaces with power monitor 32 to dynamically control use of power-consuming elements based on the power draw by electronic device 12. For example, in some embodiments, if power monitor 32 determines that the power draw by electronic device is approaching or has reached a predetermined peak power and/or average power draw threshold, power management module 30 adjusts and/or otherwise ceases various operational parameters of power-consuming elements of electronic device 12 to control and/or otherwise limit the power draw of electronic device 12.

In the embodiment illustrated in FIG. 1, electronic device 12 comprises power-consuming elements 40. In FIG. 1, power-consuming elements 40 comprise a drive device 42, audio component(s) 44, a display controller 46, a graphics application 48, an e-mail application 50, a web browser 52, a wireless application 54, and operating system (O/S) background application(s) or service(s) 56. It should be understood that power-consuming elements 40 may comprise additional and/or alternative elements depending on the type of electronic device 12 and/or function (e.g., wireless controller/subsystem, Ethernet controller/subsystem, camera, lights, media player, microphone, operating system components, drivers, middleware, software applications, applets, subroutines, etc.). For ease of illustration, power-consuming elements 40 are shown as being separate and/or apart from memory 24. However, it should be understood that various types of power-consuming elements 40 may reside in memory 24 (e.g., display controller 46, graphics application 48, an e-mail application 50, a web browser 52, a wireless application 54, and operating system (O/S) background application(s) or service(s) 56).

In FIG. 1, electronic device 12 also comprises a database 60 having information associated with a prioritization 62 of power-consuming elements 40 and power draw limit(s) 64 settings. Prioritization 62 comprises a prioritization of various power-consuming elements 40 (e.g., a level of importance to a user of electronic device 12) to facilitate control of use of power-consuming elements 40 to enable operation of electronic device 12 within (i.e., at or below/under) power draw limit(s) 64. For example, in the embodiment illustrated in FIG. 1, prioritization 62 comprises a listing of high priority elements 70, medium priority elements 72 and low priority elements 74. High priority elements 70 generally comprise an identification of one or more power-consuming elements 40 having a generally high level of priority of use by a user of electronic device 12. Low priority element 74 generally comprise an identification of one or more power-consuming elements 40 considered as having a low level of priority of use by a user of electronic device 12. Correspondingly, medium priority elements 72 comprise an identification of one or more power-consuming elements 40 having a priority level of use greater than low priority elements 74 but less than high priority elements 70. It should be understood that the priority levels used herein are for illustrative purposes only as the prioritization could be more or less granular.

In some embodiments, prioritization 62 is dynamic and/or contains multiple levels of priority. For example, in some embodiments, particular power-consuming elements 40 may be identified as having a fixed priority level (e.g., for a cellular telephone, the functions associated with receiving and outgoing calls as high priority elements 70) while other power-consuming elements 40 may have a variable priority (even temporary) based on use or other factors (e.g., game playing on the cellular telephone may be identified as a low priority element 74, but its priority level may change to a higher level in response to a user opening the game function). Thus, for example, for a cellular telephone, game playing and camera use may both be identified as low priority elements 74. However, in response to a user initiating and/or otherwise opening the game function, the game playing element 40 is, at least temporarily, moved to a higher priority level (e.g., a medium priority level 72) such that the camera use may be inoperable in order to support use of the game functions. If the user closes the game function, the priority level associated with the game function preferably returns to its default level (e.g., low priority element 74).

In some embodiments, prioritization 62 is configurable having different sets of priorities. For example, the use of a particular device 12 may vary depending on whether device 12 is used at home, at work, in the car, the time of day, day of the week, etc. Thus, in some embodiments, priority levels for different power-consuming elements 40 vary between different categories or sets of prioritization 62. Accordingly, in some embodiments, while a word processing application may have a higher priority level in a work environment, the word processing application may have a lower priority level at night or on the weekend. Preferably, device 12 is configured to enable a user to select a particular set of prioritization 62 to be used for different types of usage or circumstances. However, it should be understood that in some embodiments, prioritization 62 is configurable with a single set of priorities.

In some embodiments, prioritization 62 is based on other factors such as, but not limited to, a signal received by device 12 (e.g., in response to a universal serial bus (USB) device being plugged into device 12, headphones being plugged into device 12, etc.), a message received by device 12 (e.g., a message received from a network and/or an indication that a network is detected/not detected) and physical changes to device 12 (e.g., opening or closing of a notebook computer lid, accelerometer signals resulting from movement of a portable computer, etc.). Thus, for example, if a wireless network is detected or if a USB device is plugged into device 12, various applications or functions associated with such actions are given a higher priority level to facilitate use thereof.

Power draw limit(s) 64 comprise information associated with a peak power draw limit 80 and an average power draw limit 82. Peak power draw limit 82 comprises information associated with a maximum predetermined peak power draw limit or threshold for operating electronic device 12. Peak power draw limit 82 may comprise a particular peak power draw level (e.g., based on a particular current and voltage level) and/or peak power draw duration (e.g., a duration of power draw at the peak power level). Thus, for example, in some embodiments, power management module 30 adjusts and/or otherwise ceases various operational parameters of power-consuming elements 40 of electronic device 12 to control and/or otherwise limit the peak power draw of electronic device 12 as well as the duration of any peak power draw. Average power draw limit 82 comprises information associated with a maximum predetermined average power draw limit or threshold for operating electronic device 12. The average power draw by electronic device 12 may be monitored and/or determined for a single operational session or extend across multiple operational sessions of electronic device 12 (e.g., a cumulative average power draw by electronic device 12 for a single operational session or extending across multiple operational sessions). Thus, for example, in some embodiments, power management module 30 adjusts and/or otherwise ceases various operational parameters of power-consuming elements 40 of electronic device 12 to control and/or otherwise limit the average power draw of electronic device 12.

Power draw limit(s) 64 may be set and/or otherwise selected by manufacturer of electronic device 12, an administrator associated with electronic device 12, a user of electronic device 12, or may be set and/or otherwise selected based on the particular power source providing power to electronic device 12. For example, in some embodiments, based on a particular configuration of electronic device 12 (e.g., processor power capabilities, cooling system design, form factor, weight, etc.), a manufacturer of electronic device 12 may desire to limit the peak power draw and/or average power draw to maintain the operational characteristics of electronic device 12 within predetermined limits. Thus, in this embodiment, for example, power draw limit(s) 64 may be stored in a flash or other type of unmodifiable memory area by the manufacturer of electronic device 12. In some embodiments, a user and/or administrator may input and/or otherwise select power draw limit(s) 64 (e.g., to control and/or otherwise manage power usage for one or more electronic devices 12 such as in a business environment for cost management). For example, in some embodiments, an administrator may be provided with privileges to set and/or otherwise select power draw limit(s) 64 for a particular electronic device 12 (e.g., either locally and/or remotely from the particular electronic device). In some embodiments, an administrator may be provided with privileges to set and/or otherwise select power draw limit(s) 64 for many electronic devices 12 (e.g., to enable power management for a network of electronic devices 12 by a remotely-located centralized system). In some embodiments, power draw limit(s) 64 are set and/or otherwise selected based on the particular power source providing power to electronic device 12 (e.g., based on the particular power rating of a battery connected to electronic device 12). It should also be understood that power draw limit(s) 64 may be dynamically selected and/or changed (e.g., based on a change to a power source powering electronic device 12 or otherwise).

In some embodiments, a user of electronic device 12 inputs and/or otherwise identifies prioritization 62 for various power-consuming elements 40 of electronic device 12 (e.g., via interface 22). For example, if the user of electronic device 12 desires to primarily utilize graphics application 48, the user indicates graphics application 48 as a high priority element 70. Other power-consuming elements 40 may be identified by the user as high priority elements 70, medium priority elements 72 and/or low priority elements 74. For example, if the user does not anticipate using web browser 52 or e-mail application 50, web browser 52 and e-mail application 50 may be identified by the user as low-priority elements 74. Input for prioritization 62 of power-consuming elements 40 may be performed using a variety of different methods such as, but not limited to, slidebars, selectable buttons or icons indicating a priority level, or an ordered listing where a location of the power-consuming element 40 within the list indicates its priority level. In operation, embodiments of system 10 turn off, reduce a power level, and/or otherwise control use of power-consuming elements 40 to provide as much functionality as possible for device 12 while maintaining the operation of electronic device 12 within power draw limit(s) 64 (e.g., by turning off low priority elements 74 first, followed by medium priority elements 72, and then high priority elements 70, as necessary, to maintain the power draw by electronic device 12 within power draw limit(s) 64).

Power monitor 32 analyzes and/or otherwise monitors the power draw conditions of electronic device 12 and determines the peak and/or average power draw by electronic device 12. For example, a user of notebook computer 14 may have graphics application 48, browser 52 and e-mail application 50 operating and/or running, thereby resulting in a particular power draw from battery 16 or power source 18. Further, as various power-consuming elements 40 are initiated and/or cessated, the power draw from the particular power source will change. Power monitor 32 is preferably configured to monitor the power draw conditions of electronic device 12 and compare the power draw conditions to power draw limit(s) 64. It should be understood that, alternatively, power management module 30 may be configured to communicate with power monitor 32 to obtain the power draw conditions of electronic device 12 and compare the power draw conditions to power draw limit(s) 64. Further, it should be understood that in some embodiments, power monitor 32 analyzes and/or otherwise monitors the power draw conditions associated with individual and/or particular elements 40 such that a determination may be made as to the level of power draw associated with a particular element 40, thereby enabling a determination as to how much of an adjustment to the particular element 40 may be made (e.g., to increase or decrease the power draw for the particular element 40) based on the power draw limit(s) 64. For example, if the power draw associated with electronic device 12 is below power limit(s) 64 to the extent that a particular element 40 may be enabled and/or otherwise adjusted to increase its power draw, historical information associated with the power draw associated with the particular element 40 may be accessed by power management module 30 to determine whether to enable the particular element 40 and/or to determine what level of enablement.

In operation, power management module 30 interfaces and/or otherwise communicates with power monitor 32 determine the power draw conditions of electronic device 12 relative to power draw limit(s) 64. If the power draw conditions are approaching and/or have reached power draw limit(s) 64, power management module 30 automatically controls use of power-consuming elements 40 based on prioritization 62 to maintain the power draw of electronic device 12 within power draw limit(s) 64. For example, if the power draw by electronic device 12 is approaching and/or has reached peak power draw limit 80, power management module 30 automatically accesses prioritization 62 and automatically controls and/or cessates use of one or more power-consuming elements 40 to prevent or substantially prevent the power draw from exceeding peak power draw limit 80. Preferably, power management module 30 controls and/or ceases use of low priority elements 74 before controlling and/or cessating use of medium priority elements 72, and controls and/or cessates use of medium priority elements 72 before controlling and/or cessating use of high priority element 70. Thus, if e-mail application 50 is identified as a low priority element 74, power management module 30 automatically closes and/or cessates use of e-mail application 50. In response to closing of e-mail application 50, if the power draw is maintained below peak power draw limit 80, no further action by power management 30 may be necessary. However, if the power draw by electronic device 12 continues to increase and/or approach peak power draw limit 80, power management module 30 proceeds to control and/or cease use of additional low priority elements 74, medium priority elements 72 and/or high priority elements 70 to enable use of the electronic device 12 while maintaining the power draw of electronic device at or below peal power draw limit 80. Correspondingly, power management module 30 controls use of power-consuming elements to maintain an average power draw by electronic device 12 at or below average power draw limit 82.

In some embodiments, power management module 30 is configured to iteratively control use of power-consuming elements 40 (e.g., turning off one element 40 at a time until requested duration 80 is achieved). However, it should be understood that power management module 30 may be configured to control multiple elements 40 concurrently. For example, particular elements 40 may have dependent elements 40 (e.g., if one element 40 is turned off, other elements 40 that operate with or are based on the turned-off element 40 are also turned off). Thus, by turning off one element 40, power savings associated with multiple elements 40 is achieved. Further, in some embodiments, power management module 30 and/or power monitor 32 is configured to determine the power usage of independent elements 40 or groups of elements 40 such that if a particular level of power savings is needed to maintain the power draw below power draw limit(s) 64, power management module 30 is configured to control use of particular elements 40 or groups of elements 40 to achieve a desired level of power savings.

The controlling of use of power-consuming elements 40 to reduce power consumption by electronic device 12 may be performed using a variety of methods. For example, in some embodiments, adjustment of display controller 46 comprises automatically adjusting (e.g., decreasing) an intensity level of a display or the displayed resolution of image content, adjusting wireless application 54 and/or drive device 42 comprises automatically placing wireless application 54 and/or drive device 42 in a sleep or hibernation state or shutting down the wireless application 54 and/or drive device 42. Thus, in some embodiments, various settings and/or functions of a particular element 40 may be adjusted to reduce power draw associated with the particular element 40 while enabling continued use of that particular element 40 (e.g., automatically decreasing a resolution setting, automatically adjusting displayed colors of a graphic display to black and white, etc.). Further, controlling of power-consuming elements 40 to reduce the power draw of electronic device 12 may comprise automatically closing particular applications (e.g., closing e-mail application 50, web browser 52 and/or services 56 running in the background of an operating system).

Additionally, in some embodiments, power management module 30 is configured to prevent opening and/or otherwise initiating use of particular power-consuming elements 40 or requests authorization to open and/or initiate use of a particular power-consuming element 40. For example, in such embodiments, if a user attempts to open and/or initiate use of a particular power-consuming element 40 that has previously been turned off and/or adjusted to reduce the power draw to below power draw limit(s) 64, power management module 30 is configured to prevent opening or using the particular power-consuming element 40 and/or display a notice to the user indicating use of the particular power consuming element 40 may and/or will exceed power draw limit(s) 64 and/or may necessitate control of other and/or higher priority elements (e.g., medium priority elements 72 and/or high priority elements 70) to maintain the power draw by electronic device below power draw limit(s) 64.

In some embodiments, power management module 30 is configured to provide and/or otherwise display a notice or other type of indication that one or more power-consuming elements 40, or a particular power-consuming element 40, will be controlled in order to maintain the power draw below power draw limit(s) 64. For example, in one embodiment, before use of a particular power-consuming element 40 is controlled and/or changed, the notice of use control provides the user with the opportunity to close or cease use of other power-consuming elements 40 to reduce power draw and/or enables the user to re-prioritize the prioritization 62. The notice may be provided via a visual display, an audible indication, or communicated to a remote device or system (e.g., a printer or a remote monitoring system).

It should also be understood that for different types of electronic devices, different types of control of use may be performed. For example, if the electronic device 12 comprises a vehicle configured to be partially and/or fully battery powered, power management module 30 may be configured to prevent the use of particular power-consuming elements 40 to enable use of the vehicle while maintaining the power draw by the vehicle to below power draw limit(s) 64 (e.g., preventing use of a radio or audio components 44 of the vehicle, dimming interior lighting of the vehicle, shutting off and/or preventing use of air conditioning, dimming exterior lights such as running lights (while leaving headlights and tail/brake lights at full power), etc.).

Further, power management module 30 is configured to dynamically respond to activation and/or deactivation of various power-consuming elements 40. For example, in some embodiments, power management module 30 is configured to automatically open or control use of power-consuming elements 40 in response to a surplus of power. In this example, if one or more power-consuming elements 40 was previously adjusted and/or closed to reduce the power draw and subsequently other power-consuming elements 40 are closed and/or adjusted (e.g., closing of a particular application or element 40 by a user), power management module 30 is configured to automatically open and/or adjust/enable use of the previously closed elements 40. For example, if power management module 30 previously closed e-mail application 50 to reduce the power draw by electronic device 12 and subsequently a user closes graphics application 48 or another power-consuming element 40, power management module 30 is configured to automatically re-open e-mail application 50 (or enable it to be opened) provided opening of e-mail application 50 does not result in a power draw exceeding power draw limit(s) 64. Thus, power management module 30 is configured to dynamically respond to the use and/or non-use of various power-consuming elements 40 to facilitate use of electronic device 12 while maintaining the power draw by electronic device 12 to below power draw limit(s) 64.

In some embodiments, power management module 30 is configured to notify a user if power draw adjustments are necessary. For example, in some embodiments, power management module 30 is configured to indicate to the user the power draw by electronic device 12 (e.g., via a visual display and/or otherwise) and/or indicate or suggest to the user other power-consuming elements 40 that may be controlled to maintain the power draw below power draw limit(s) 64. Power management module 30 may also be configured to indicate to the user the power-consuming elements 40 presently running/operating and request that the user select particular power-consuming elements 40 to control in order to maintain the power draw by electronic device below power draw limit(s) 64.

Embodiments of system 10 also dynamically respond to changes in use of power-consuming elements 40 and/or changes in a particular power source. For example, if battery 16 is replaced with another battery 16 having different power capabilities and/or power rating, power management module 30 is configured to automatically adjust power draw limit(s) 64 (e.g., peak power draw limit 80 and/or average power draw limit 82) based on the detected condition of the newly inserted battery 16. Further, for example, if device 12 is configured having multiple batteries 16 and/or different types of batteries 16 (e.g., a rechargeable lithium-ion battery and a solar-powered battery), power management module 30 is configured to dynamically respond to different power draw conditions. Thus, in this example, if a user of device 12 enters a darkened room, thereby resulting in potentially less power being available from a solar-powered battery, power management module 30 dynamically responds to the change in condition by controlling, as necessary, the use of power-consuming elements 40. Correspondingly, if a user of device 12 leaves a darkened room and enters into sunlight, power management module 30 dynamically responds to the probable increase in available power by enabling use of or activating power-consuming elements 40.

Figure 2:
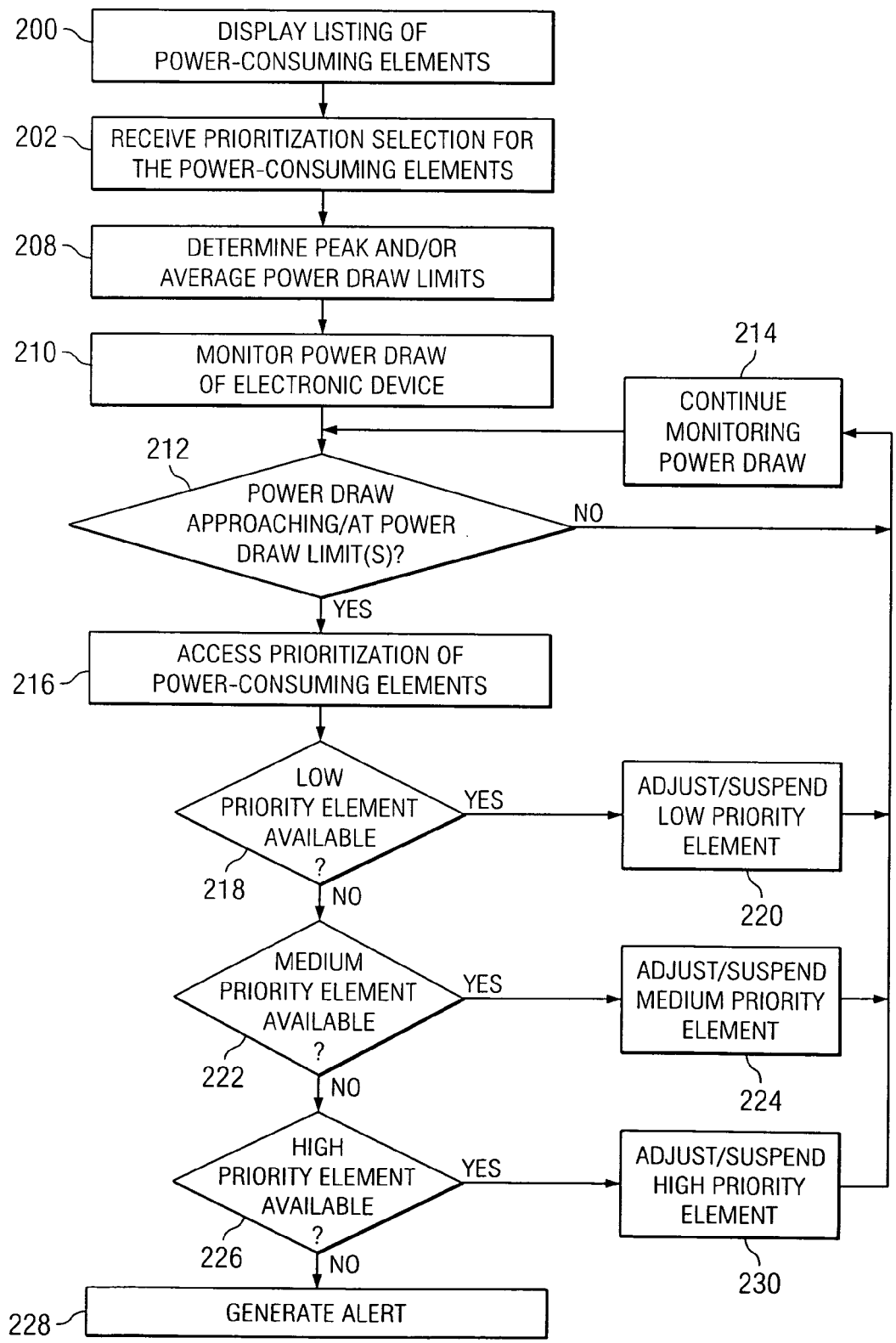
FIG. 2 is a flow diagram illustrating an embodiment of a power management method.

FIG. 2 is a flow diagram illustrating an embodiment of an electronic device power management method. In FIG. 2, the depicted method illustrates reducing the power draw associated with electronic device 12 (e.g., by reducing and/or cessating use of elements 40); however, it should be understood that a similar method may be used to enable use of and/or facilitating an increased power draw by particular elements 40 in response to a surplus power condition). The method begins at block 200, where power management module 30 provides and/or otherwise displays a listing of power-consuming elements 40 of electronic device 12. For example, in some embodiments, power management module 30 is configured to display power-consuming elements 40 via interface 22 (e.g., as textual and/or graphical icons representing the power-consuming element 40 of electronic device 12) to facilitate prioritization of power-consuming elements 40 by a user of electronic device 12. However, it should be understood that in some embodiments, displaying a listing of power-consuming elements 40 may be optional and/or unnecessary (e.g., using a default or previously input prioritization). At block 202, power management module 30 receives prioritization 62 from a user of electronic device 12. For example, prioritization 62 preferably comprises a classification of various power elements 40 as either low priority elements 74, medium priority elements 72 or high priority elements 70. At block 208, power management module 30 and/or power monitor 32 determines peak power draw limit 80 and/or average power draw limit 82 for operating electronic device 12. For example, in some embodiments, peak power draw limit 80 and/or average power draw limit 82 values may be requested and/or received via input by a user of electronic device 12, retrieved from memory 24 (e.g., based on pre-stored values), derived (e.g., calculated and/or otherwise determined) based on a particular power source providing power to electronic device 12, and/or obtained directly from the particular power source providing power to electronic device 12 (e.g., from a memory register of a connected battery).

At block 210, power monitor 32 monitors the power draw by electronic device 12. At decision block 212, a determination is made whether the power draw by electronic device is approaching and/or reached peak power draw limit 80 and/or average power draw limit 82. If the power draw by electronic device 12 is not nearing and/or reached peak power draw limit 80 and/or average power draw limit 82, the method proceeds to block 214, where power monitor 32 continues monitoring the power draw by electronic device 12. If the power draw by electronic device is approaching and/or reached peak power draw limit 80 and/or average power draw limit 82, the method proceeds to block 216, where power management module 30 accesses prioritization 62 of power-consuming elements 40 of electronic device 12.

At decision block 218, a determination is made whether any low priority elements 74 are available for control and/or cessation. If at least one low priority element 74 is available for control and/or cessation, the method proceeds to block 220, where power management module 30 automatically adjusts and/or suspends operation of at least one low priority element 74 (which may also result in the adjustment and/or suspension of additional "dependent" elements 40 as discussed above). The method proceeds to block 214, where power monitor 32 continues to monitor the power draw by electronic device 12. For example, if the power draw by electronic device 12 remains at or just slightly below peak power draw limit 80 and/or average power draw limit 82, the method depicted at blocks 216, 218 and 220 may be repeated until the power draw by electronic device 12 is below power draw limit 80 and/or average power draw limit 82 (e.g., slightly below or below by some predetermined amount) or until no more power-consuming elements 40 remain available for control.

At the decision block 218, if a determination is made that no low priority element 74 is available for adjustment and/or cessation, the method proceeds to decision block 222, where a determination is made whether any medium priority elements 72 are available for control and/or cessation. If a medium priority element 72 is available for control and/or cessation, the method proceeds to block 224, where power management module 30 controls and/or suspends operation of at least one medium priority element 72. The method proceeds to block 214 where power monitor 32 continues to monitor the power draw by electronic device 12. As discussed above, if the power draw remains near or at peak power draw limit 80 and/or average power draw limit 82, the method depicted at blocks 216, 218, 222 and 224 may be repeated until the power draw by electronic device 12 is below peak power draw limit 80 and/or average power draw limit 82 (e.g., slightly below or below by some predetermined amount) or until no more power-consuming elements 40 remain available for control.

At the decision block 222, if a determination is made that no medium priority elements 72 are available for control and/or cessation, the method proceeds to decision block 226, where a determination is made whether a high priority element 70 is available for control and/or cessation. If a high priority element 70 is available, the method proceeds to block 230, where power management module 30 adjusts and/or suspends operation of at least one high priority element 70. The method proceeds to block 214, where power monitor 32 continues monitoring the power draw by electronic device 12. As discussed above, the method depicted by blocks 216, 218, 222, 226 and 230 may be repeated until power draw by electronic device 12 is below peak power draw limit 80 and/or average power draw limit 82 (e.g., slightly below or below by some predetermined amount) or until no more power-consuming elements 40 remain available for control. At decision block 226, if a determination is made that no high priority elements 70 are available for control and/or cessation, the method proceeds to block 228, where power management module 30 alerts the user that operation of electronic device 12 within power draw limit 64 parameters may not be possible.

Figure 3:
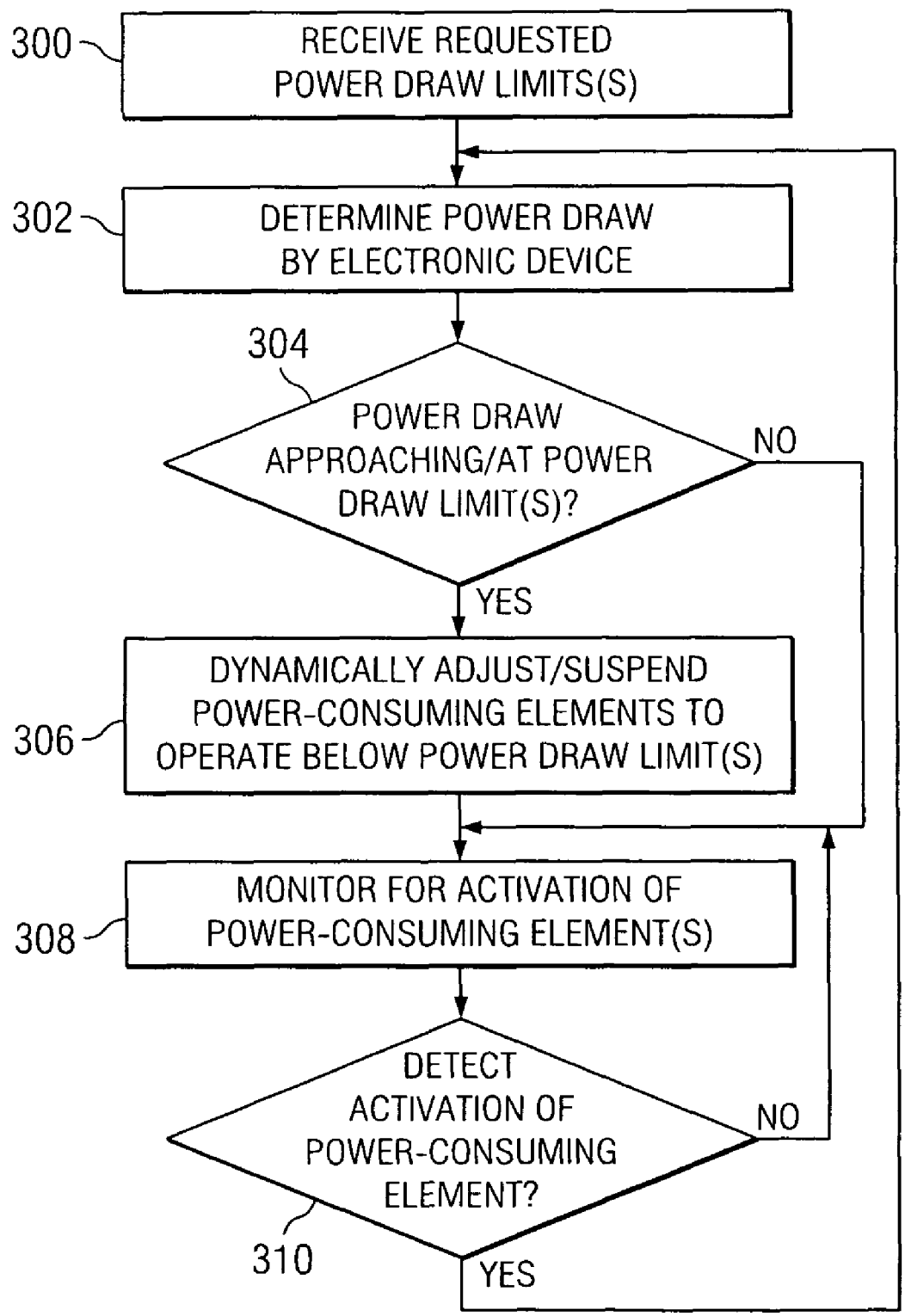
FIG. 3 is a flow diagram illustrating another embodiment of a power management method.

FIG. 3 is a flow diagram illustrating another embodiment of an electronic device power management method. The method begins at block 300, where power management module 30 receives power draw limit(s) 64 (e.g., received via user input). At block 302, power monitor 32 determines and/or otherwise monitors the power draw by electronic device 12. At decision block 304, a determination is made whether the power draw by electronic device is approaching or has reached power draw limit(s) 64. If it is determined that the power draw by electronic device 12 is approaching or has reached power draw limit(s) 64, the method proceeds to block 306, where power management module 30 dynamically adjusts/suspends power-consuming element(s) 40 to maintain operation of electronic device 12 below power draw limit(s) 64. At block 308, power management module 30 and/or power monitor 32 continue to monitor activation and/or operation of additional power-consuming elements 40. If it is determined that the power draw by electronic device 12 is not yet approaching or at power draw limit(s) 64, the method proceeds from decision block 304 to block 308.

At decision block 310, a determination is made whether another power-consuming element 40 has been activated and/or use otherwise initiated. For example, a user and/or another application may automatically invoke and/or otherwise cause operation or activation of a previously unused power-consuming element 40 (e.g., opening and/or using a media player, web browser 52, e-mail application 50, accessing of drive device 42 or another type of power-consuming 40). At decision block 310, if a determination is made that another power-consuming element has been activated, the method proceeds to block 302, where power management module 30 and/or power monitor 32 dynamically respond to the activation of the power-consuming element 40 to determine whether control and/or cessation of one or more power-consuming elements 40 based on prioritization 62 is necessary to maintain operation of the electronic device 12 below power draw limit(s) 64. If it is determined that no further power-consuming element 40 has been activated, the method proceeds to block 308, where power management module 30 and/or power monitor 32 continue monitoring for activation and/or use of a power-consuming element 40.

Thus, embodiments of system 10 enable use of electronic device 12 while maintaining a power draw by electronic device below predetermined limits by automatically and/or dynamically adjusting power usage by device 12 based on a prioritization 62 of power-consuming elements 40. For example, embodiments of system 10 enable a user to classify and/or otherwise designate a level of use priority for different power-consuming elements 40 of device 12 such that lower priority elements may be automatically closed, adjusted and/or otherwise controlled to reduce the amount of power drawn by device 12 from a particular power source to maintain the power draw by electronic device 12 below predetermined limits. Accordingly, embodiments of system 10 facilitate power savings and/or otherwise enable reduced energy costs as well as facilitate compliance with various energy-related industry standards or guidelines. It should be understood that in the described methods, certain functions may be omitted, accomplished in a sequence different from that depicted in FIGS. 2 and 3, or performed simultaneously. Also, it should be understood that the methods depicted in FIGS. 2 and 3 may be altered to encompass any of the other features or aspects as described elsewhere in the specification. Further, embodiments may be implemented in software and can be adapted to run on different platforms and operating systems. In particular, functions implemented by power management module 30 and/or power monitor 32, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electro-magnetic, infrared, or semiconductor system, apparatus, device, or propagation medium.

What is claimed is:

1. A power management system, comprising:
a power monitor configured to monitor power draw by an electronic device; and
a power management module configured to determine a power draw limit for operating the electronic device by a power source, the power management module configured to control use of power-consuming elements of the electronic device based on a prioritization of the power-consuming elements to limit power draw by the electronic device from the power source to the power draw limit.

2. The system of claim 1, wherein the power management module is configured to adjust functionality of the electronic device by adjusting displayed colors of a display of the electronic device to only black and white to reduce power draw.

3. The system of claim 1, wherein the power monitor is configured to monitor power draw associated with at least one power-consuming element of the electronic device, wherein power draw comprises a rate of power consumption.

4. The system of claim 1, wherein the power management module is configured to enable an element from the power-consuming elements and to set enablement for the element based on historical information of power draw for the element.

5. The system of claim 1, wherein the power management module is configured to control use of at least one of the power-consuming elements in response to initiation of use of at least another of the power-consuming elements.

6. The system of claim 1, wherein the prioritization comprises at least two priority levels of the power-consuming elements, and wherein the prioritization comprises priority levels for a majority of the power-consuming elements in the electronic device.

7. The system of claim 1, wherein the power management module is configured to cease use of at least one of the power-consuming elements.

8. The system of claim 1, further comprising an interface for receiving from a user the power draw limit.

9. The system of claim 1, wherein the power draw limit comprises an average power draw limit.

10. The system of claim 1, wherein the power management module is configured to dynamically compare the power draw of the electronic device to the power draw limit.

11. The system of claim 1, wherein the power management module is configured to dynamically respond to a change in an amount of power available from the power source.

12. The system of claim 1, wherein the power management module is configured to enable use of at least one power-consuming element in response to inactivation of at least another power-consuming element.

13. A power management system, comprising:
means for determining a power draw limit for operating an electronic device by a power source;
means for monitoring power draw of the electronic device; and
means for controlling use of power-consuming elements of the electronic device based on a prioritization of the power-consuming elements to limit power draw by the electronic device from the power source to the power draw limit.

14. The system of claim 13, wherein the prioritization comprises at least two different levels of prioritization for the power-consuming elements.

15. The system of claim 13, where the means for controlling use is configured to enable an element from the power-consuming elements and to set a degree of enablement based on historical information of power draw for the element.

16. The system of claim 13, wherein the controlling means comprises means for controlling at least one of the power-consuming elements in response to an initiation of use of another of the power-consuming elements.

17. A power management method, comprising:
determining a power draw limit for operating an electronic device by a power source;
monitoring power draw by the electronic device; and
controlling use of power-consuming elements of the electronic device based on a prioritization of the power-consuming elements to limit power draw by the electronic device from the power source to the power draw limit.

18. The method of claim 17, wherein the prioritization comprises priority levels of the power-consuming elements.

19. The method of claim 17, further comprising controlling use of at least one of the power-consuming elements in response to initiation of use of at least another of the power-consuming elements.

20. The method of claim 17, further comprising automatically ceasing use of at least one of the power-consuming elements.

21. The method of claim 17, further comprising identifying a level of prioritization for at least one of the power-consuming elements.

22. The method of claim 17, further comprising receiving from a user of the electronic device the power draw limit.

23. The method of claim 17, wherein determining the power draw limit comprises determining a peak power draw limit or an average power draw limit, or a combination thereof.

24. The method of claim 17, further comprising determining a power draw associated with at least one power-consuming element of the electronic device.

25. A power management system, comprising:
   a power monitor configured to monitor power draw by an electronic device, wherein the power draw comprises a rate of power consumption; and
   a power management module configured to determine a power draw limit setting for the electronic device, the power management module configured to dynamically control use of at least one power-consuming element of the electronic device to limit the power draw by the electronic device from a power source to the power draw limit setting.

26. The system of claim 25, wherein the power management module is configured to enable a selected element from the power-consuming elements and set a power amount of enablement based on historical information of power draw for the selected element.

27. The system of claim 25, wherein the power management module is configured to dynamically adjust a priority level of at least one power-consuming element.

28. The system of claim 25, wherein the power management module is configured to determine an amount of power usage associated with at least one power-consuming element of the electronic device to determine which power-consuming element to control.

29. The system of claim 25, wherein the power management module is configured to dynamically adjust a priority level of at least one power-consuming element of the electronic device in response to use of the at least one power-consuming element.

30. The system of claim 1, wherein the power management module comprises the power monitor.

31. The system of claim 1, wherein the power management module is configured to adjust functionality of a selected element from the power-consuming elements to reduce power draw used by the selected element while enabling continued use of the selected element.

32. The system of claim 1, wherein the power management module is configured to adjust functionality of the electronic device by decreasing a resolution setting for a display of the electronic device to reduce power draw.

33. The method of claim 17, wherein the power draw comprises a rate of power consumption.

34. The method of claim 17, wherein the prioritization comprises sets of priorities for the power-consuming elements.

* * * * *